United States Patent
Obbard et al.

(10) Patent No.: US 11,663,247 B2
(45) Date of Patent: *May 30, 2023

(54) SYSTEM, METHOD AND ARCHITECTURE FOR A DOCUMENT AS A NODE ON A SOCIAL GRAPH

(71) Applicant: Open Text SA ULC, Halifax (CA)

(72) Inventors: Geoffrey Michael Obbard, Waterloo (CA); Quinton James Roberts, Wyevale (CA)

(73) Assignee: Open Text SA ULC, Halifax (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/464,834

(22) Filed: Sep. 2, 2021

(65) Prior Publication Data

US 2021/0397633 A1 Dec. 23, 2021

Related U.S. Application Data

(63) Continuation of application No. 16/201,799, filed on Nov. 27, 2018, now Pat. No. 11,138,245, which is a (Continued)

(51) Int. Cl.
*G06F 16/21* (2019.01)
*G06F 16/248* (2019.01)
(Continued)

(52) U.S. Cl.
CPC ............ *G06F 16/31* (2019.01); *G06F 16/211* (2019.01); *G06F 16/248* (2019.01);
(Continued)

(58) Field of Classification Search
CPC .......... G06F 16/31; G06F 16/33; G06F 16/38; G06F 16/43; G06F 16/387; G06F 16/335;
(Continued)

(56) References Cited

U.S. PATENT DOCUMENTS 8,606,792 B1 12/2013 Jackson et al.
9,247,021 B1 1/2016 Obbard et al.
(Continued)

OTHER PUBLICATIONS

Office Action issued for U.S. Appl. No. 14/558,506, dated Apr. 24, 2015, 14 pages.
(Continued)

*Primary Examiner* — Jorge A Casanova
(74) *Attorney, Agent, or Firm* — Sprinkle IP Law Group

(57) ABSTRACT

A content management system may instantiate, from the same super class defined in a database schema, principal objects representing users and groups and content objects representing documents and folders. The principal objects and the content objects share the same social interaction functions. When a content object is modified, the system can create a message in which the content object identifies itself as a first person, update a message table such that any follower of the content object is notified of the message, and update a profile or feed associated with the content object. At least because content objects can "socialize" like principal objects, the system can generate a social graph containing content objects as nodes, map relationships among principal objects and content objects, and make recommendations to perhaps change/enhance such relationships.

20 Claims, 14 Drawing Sheets

Related U.S. Application Data continuation of application No. 15/357,562, filed on Nov. 21, 2016, now Pat. No. 10,176,267, which is a continuation of application No. 14/970,883, filed on Dec. 16, 2015, now Pat. No. 9,519,730, which is a continuation of application No. 14/558,506, filed on Dec. 2, 2014, now Pat. No. 9,247,021.

(60) Provisional application No. 62/076,998, filed on Nov. 7, 2014.

(51) Int. Cl.

| | | |
|---|---|---|
| *G06F 16/28* | (2019.01) | |
| *G06F 16/31* | (2019.01) | |
| *G06F 16/33* | (2019.01) | |
| *G06F 16/335* | (2019.01) | |
| *G06F 16/383* | (2019.01) | |
| *G06F 16/387* | (2019.01) | |
| *G06F 16/43* | (2019.01) | |
| *G06F 16/901* | (2019.01) | |
| *G06F 16/93* | (2019.01) | |
| *G06F 16/9535* | (2019.01) | |
| *G06Q 50/00* | (2012.01) | |
| *H04L 29/08* | (2006.01) | |
| *H04L 67/306* | (2022.01) | |
| *H04L 67/10* | (2022.01) | |

(52) U.S. Cl.
CPC ............ *G06F 16/289* (2019.01); *G06F 16/33* (2019.01); *G06F 16/335* (2019.01); *G06F 16/383* (2019.01); *G06F 16/387* (2019.01); *G06F 16/43* (2019.01); *G06F 16/9024* (2019.01); *G06F 16/93* (2019.01); *G06F 16/9535* (2019.01); *G06Q 50/01* (2013.01); *H04L 67/306* (2013.01); *H04L 67/10* (2013.01)

(58) Field of Classification Search
CPC .... G06F 16/383; G06F 16/9535; G06F 16/93; G06F 16/211; G06F 16/248; G06F 16/289; G06F 16/9024; G06Q 50/01; H04L 67/306; H04L 67/10
See application file for complete search history.

(56) References Cited

U.S. PATENT DOCUMENTS

| | | |
|---|---|---|
| 9,519,730 B2 | 12/2016 | Obbard et al. |
| 10,176,267 B2 | 1/2019 | Obbard et al. |
| 2009/0287685 A1 | 11/2009 | Charnock et al. |
| 2012/0143917 A1 | 6/2012 | Prabaker et al. |
| 2013/0073568 A1 | 3/2013 | Federov et al. |
| 2014/0280952 A1 | 9/2014 | Shear et al. |
| 2014/0282586 A1 | 9/2014 | Shear et al. |
| 2016/0132613 A1 | 5/2016 | Obbard et al. |
| 2019/0108181 A1 | 4/2019 | Obbard et al. |

OTHER PUBLICATIONS

Office Action issued for U.S. Appl. No. 16/201,799, dated Oct. 8, 2020, 8 pages.

Office Action issued for U.S. Appl. No. 16/201,799, dated Mar. 10, 2021, 7 pages.

Notice of Allowance issued for U.S. Appl. No. 16/201,799, dated Jun. 2, 2021, 5 pages.

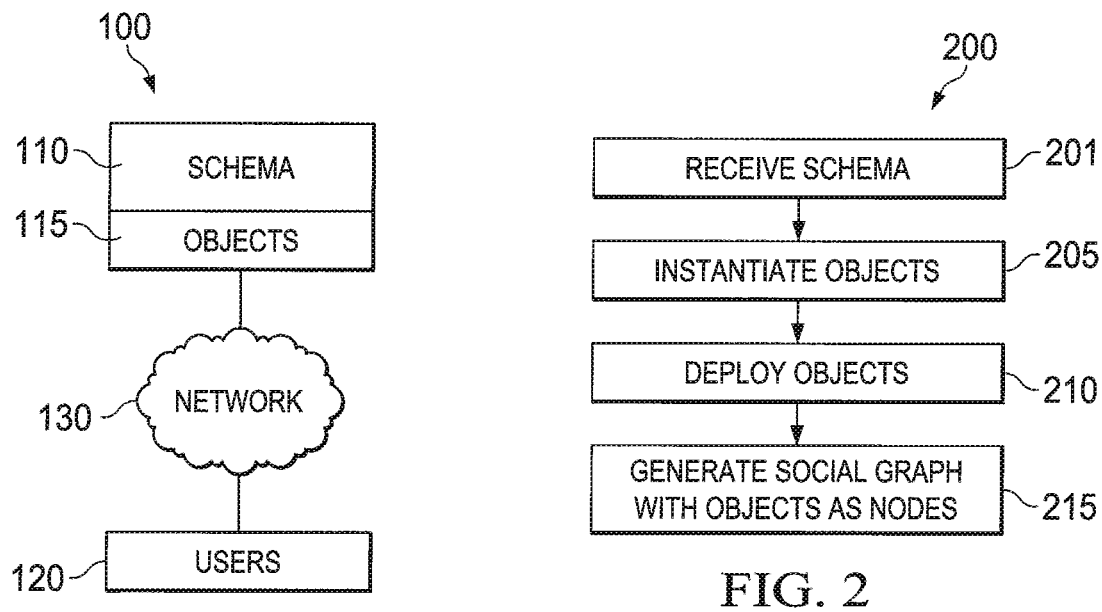
FIG. 1
FIG. 2
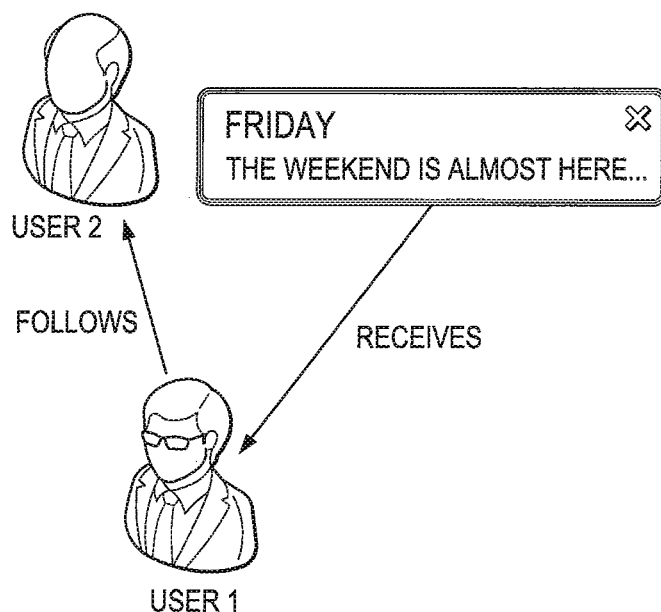
FIG. 3

FIG. 8

USER1 5

Search...

Competitive Market Survey - Q2 2011.xlsx
CREATED BY USER 1 - LAST MODIFIED 5 HOURS AGO BY USER 2

Share your comments...

show: Everything

USER 2 POSTED A NEW VERSION (10).
5 hours ago · Like · Comment

> USER 3  Great - thanks for putting this together so quick!
> 4 hours ago · Like > USER 4  Agreed.
> 4 hours ago · Like · Follow Nick Share your comments...

USER 5 ADDED THIS DOCUMENT TO PLANNING.
Yesterday · Like · Comment · Join network

USER 3 AND 2 OTHERS ARE NOW FOLLOWING THIS DOCUMENT.

August 10, 2011  4:50 PM EST

USER 6 MODIFIED THE DETAILS FOR THIS DOCUMENT.
- Document Shortcut changed to CMS.
- Description updated to *"Brand new market survey."*
- Metadata tags added: *market, survey, 5 more ...*
- Added to network Product Management Forecast.

August 2, 2011  10:12 AM EST · Like · Comment · Follow Adam

> USER 4  Approved. ☺
> 4 hours ago · Like · Follow Nick

Share your comments...

+ Following

Actions                          more

- Pulse Feed
- Edit
- Download

Followers (15)                   invite view all

Related Networks (4)             add
- PLANNING
- PRODUCT MANAGEMENT FORECAST
- MARKET SURVEYS
- SALES & MARKETING

800

SYSTEM, METHOD AND ARCHITECTURE FOR A DOCUMENT AS A NODE ON A SOCIAL GRAPH

CROSS-REFERENCE TO RELATED APPLICATION(S)

This patent application is a continuation of, and claims a benefit of priority under 35 U.S.C. § 120 from, U.S. patent application Ser. No. 16/201,799, filed Nov. 27, 2018, now U.S. Pat. No. 11,138,245, entitled, "SYSTEM, METHOD AND ARCHITECTURE FOR A DOCUMENT AS A NODE ON A SOCIAL GRAPH," which is a continuation of, and claims a benefit of priority under 35 U.S.C. § 120 from, U.S. patent application Ser. No. 15/357,562, filed Nov. 21, 2016, now U.S. Pat. No. 10,176,267, entitled, "SYSTEM, METHOD AND ARCHITECTURE FOR A DOCUMENT AS A NODE ON A SOCIAL GRAPH," which is a continuation of, and claims a benefit of priority under 35 U.S.C. § 120 from, U.S. patent application Ser. No. 14/970,883, filed Dec. 16, 2015, now U.S. Pat. No. 9,519,730, entitled "SYSTEM, METHOD AND ARCHITECTURE FOR A DOCUMENT AS A NODE ON A SOCIAL GRAPH," which is a continuation of, and claims a benefit of priority under 35 U.S.C. § 120 from, U.S. patent application Ser. No. 14/558,506, filed Dec. 2, 2014, now U.S. Pat. No. 9,247,021, entitled "SYSTEM, METHOD AND ARCHITECTURE FOR A DOCUMENT AS A NODE ON A SOCIAL GRAPH," which claims a benefit of priority under 35 U.S.C. § 119(e) from U.S. Provisional Application No. 62/076,998, filed Nov. 7, 2014, entitled "SYSTEM, METHOD AND ARCHITECTURE FOR A DOCUMENT AS A NODE ON A SOCIAL GRAPH." All applications referenced in this paragraph are hereby fully incorporated by reference herein.

TECHNICAL FIELD

This disclosure relates generally to content management. More particularly, embodiments disclosed herein relate to a system, method, and architecture for enabling content such as a document object to participate in social aspects of a content management system much like human users.

SUMMARY OF THE DISCLOSURE

Traditional content management systems generally do not provide social features such as follow, comment, mention, likes, etc. Instead, a separate social system such as a collaboration tool or a community forum may be used where certain users (e.g., a marketing team, an engineering group, etc.) may interact with one another. During such a user interaction, a link to a document may be provided. To view the document, a user would need to select the link, be authorized to view the document, and have proper software to open the document.

An object of this disclosure is to provide a technical solution where content can be an active/proactive participant in social interactions in a content management system such as a content server. Another object of this disclosure is to capture such social interactions and present them in a social graph that diagrammatically illustrates the social relationships between users, documents, and users and documents, for instance.

These and other objects can be achieved through embodiments of systems, methods and computer program products disclosed herein. For example, in some embodiments, a method may comprise providing a database schema in which all objects of different types—including user objects and content objects—are instantiated from the same super class defined in the database schema. These various types of objects share a set of common properties and/or functions defined in the super class. These common properties and/or functions allow the various types of objects to use and participate in the same social aspects of a content management system such that a document can follow a user or another document in much the same way that a user can follow a document or another user.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 1 depicts a diagrammatic representation of an example embodiment of a network architecture illustrating how users may interact with managed objects of a content management system in a network computing environment;

FIG. 2 is a flow chart illustrating one embodiment of a method for content based social interactions;

FIGS. 3-7 depict diagrammatic representations of document social interactions in one embodiment of a content management system;

FIG. 8 depicts a diagrammatic representation of an example embodiment of an activity feed or stream associated with a document;

DETAILED DESCRIPTION

Glossary

Figure 4:
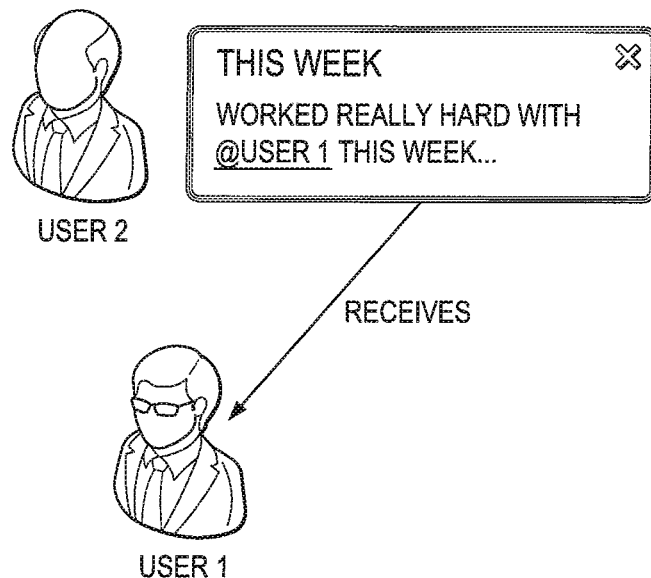

Managed object—a software object owned by an entity, managed via a content management system owned by said entity, and residing in a computing environment owned and operated by said entity.

Content management system—a computer application that allows publishing, editing, modifying, organizing, deleting, maintenance, and management of content.

Database schema—a formal description of a database system.

Super class—a class from which other classes are derived.

Principal object—a type of software object each representing a user or group.

Content object—a type of software object each representing a content item, for example, a file, folder, form, workflow, project, task, list, report, wikis, or the like.

Social interaction—a social behaviour or social action by one entity which directly or indirectly addresses one or more entities, which solicits a response or responses from other(s) and which, in turn, forms a basis of social relations of all involved.

Social object—a type of software object defined with one or more social actions.

Social action—an act by an entity which takes into account actions of and reactions of other(s).

Entity—a person or a piece of content.

Social graph—a graph that depicts social relations among a plurality of entities.

Feed—a mechanism for entities to receive updated data from sources.

The invention and the various features and advantageous details thereof are explained more fully with reference to the non-limiting embodiments that are illustrated in the accompanying drawings and detailed in the following description. Descriptions of well-known processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

FIG. 1 depicts a diagrammatic representation of an example embodiment of a network architecture illustrating how users may interact with managed objects of a content management system in a network computing environment. Specifically, content management system 100 may manage objects 115 instantiated from schema 110 (e.g., a database schema). Schema 110 may contain a formal description of a database storing objects 115. Objects 115 may include user objects associated with users 120 as well as content objects such as documents that are digital assets managed by content management system 100. Users 120 may access and interact with these digital assets over network 130.

Content management system 100 may have a wealth of knowledge on users 120, including who they are, what content they create, what content they consume, what projects they work on, how they use the system, what content they like, follow, or have commented on, etc. Additionally, content management system 100 may have knowledge on where users 120 work, what functionality of the system they currently use, have used in the past, or frequently use, what content they are interested in, what their roles are in the network computing environment, and so on. Such knowledge may be collected and/or built on metadata about objects 115. It may be desirable to improve and/or enhance user experience based on this knowledge. One approach is to add more metadata and link them to a separate system such as a collaboration tool or a community forum as discussed above. However, metadata can be cumbersome, complex, hard to maintain, hard for users to understand, and computationally expensive.

Accordingly, embodiments disclosed here provide a content-centric approach that intelligently utilizes the comprehensive knowledge gained by a content management system to help entities (including users and documents) collaborate, interact, and take necessary actions. Some embodiments provide a social graph that maps how these entities, which are represented on the social graph as nodes, are related. This is further described below.

FIG. 2 is a flow chart illustrating one embodiment of a method for content based social interactions. In this example, method 200 may include receiving a schema (201), instantiating various types of objects based on a super class defined in the schema (205) (e.g., schema 110 described above with reference to FIG. 1), deploying the instantiated various types of objects (210), and generating a social graph with the various types of objects, including documents and users, as nodes on the same social graph connected by edges representing relationships among them.

In some embodiments, method 200 may be performed by a content management system embodied on non-transitory computer memory including instructions translatable by at least one processor. In some embodiments, a method may comprise instantiating principal objects and content objects from a super class. The principal objects may be associated with users and groups of the content management system operating in a network computing environment. The content objects may be associated with documents and folders managed by the content management system. The content objects may reside at a data storage layer of the content management system and may inherit from the super class the same social interaction functions as the principal objects.

In some embodiments, when a content object in the network computing environment is modified, the content management system may operate to create a message in which the content object identifies itself as a first person, update a message table at a social layer of the content management system such that any follower of the content object is notified of the message, and may update a profile or feed associated with the content object. The message generated by the system may further identify an author who modified the content object and may generate another message indicating that the author modified the content object and may also update a profile or feed associated with the author accordingly. As explained further below, these social interaction functions may include at least a method for following, liking, or commenting on an object instantiated from the super class. Thus, rather than analyzing individual objects and/or relying on metadata, embodiments can analyze how the structure of connections affects entities and their relationships with others within the network computing environment.

Examples of social interactions among content objects and users in a content management system will now be described.

Figure 10:
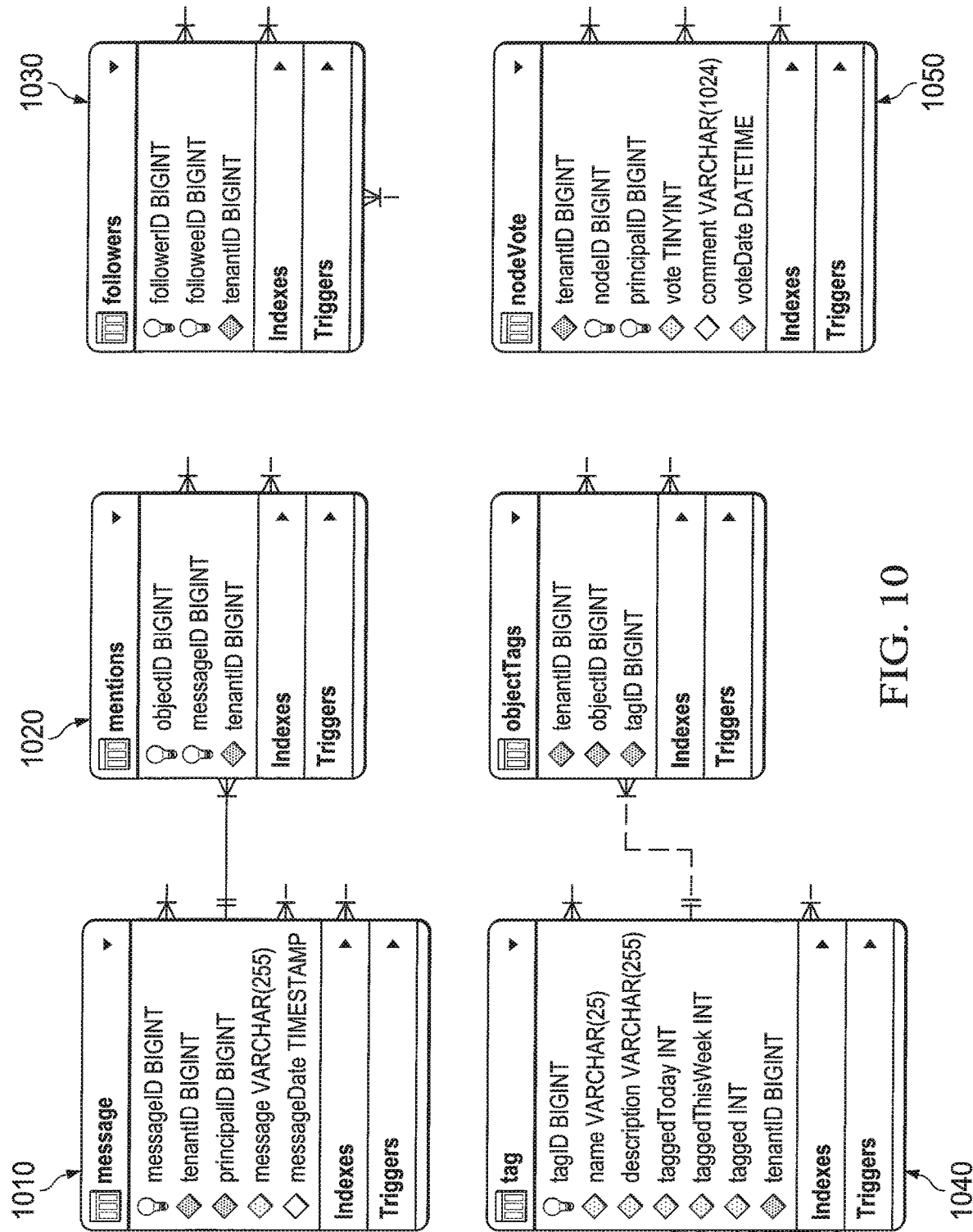
FIG. 10 depicts a diagrammatic representation of a social layer of a database schema according to one embodiment.
Figure 11A:
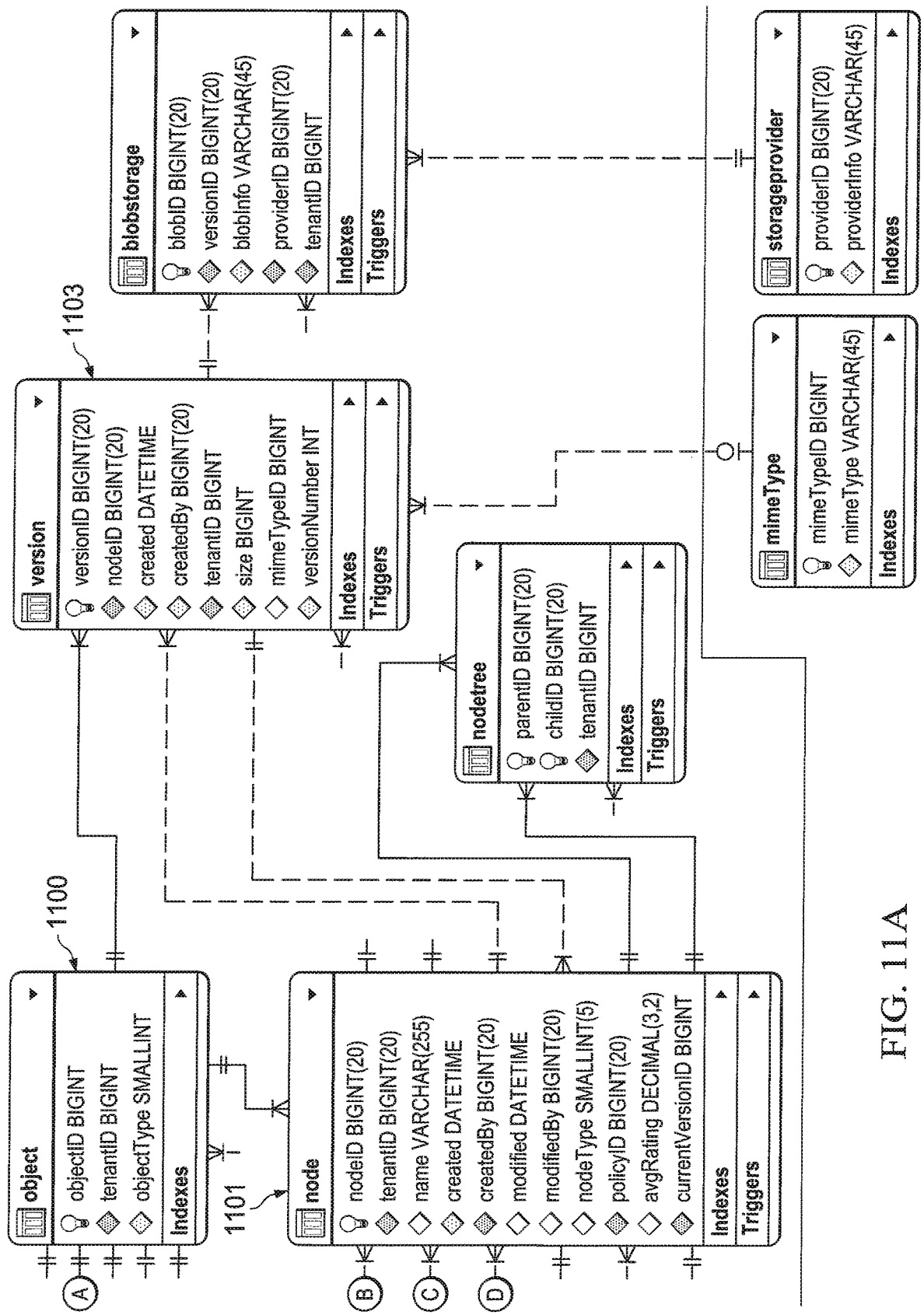
FIGS. 11A-11B depict diagrammatic representations of portions of a data storage layer of a database schema according to one embodiment.
Figure 11B:
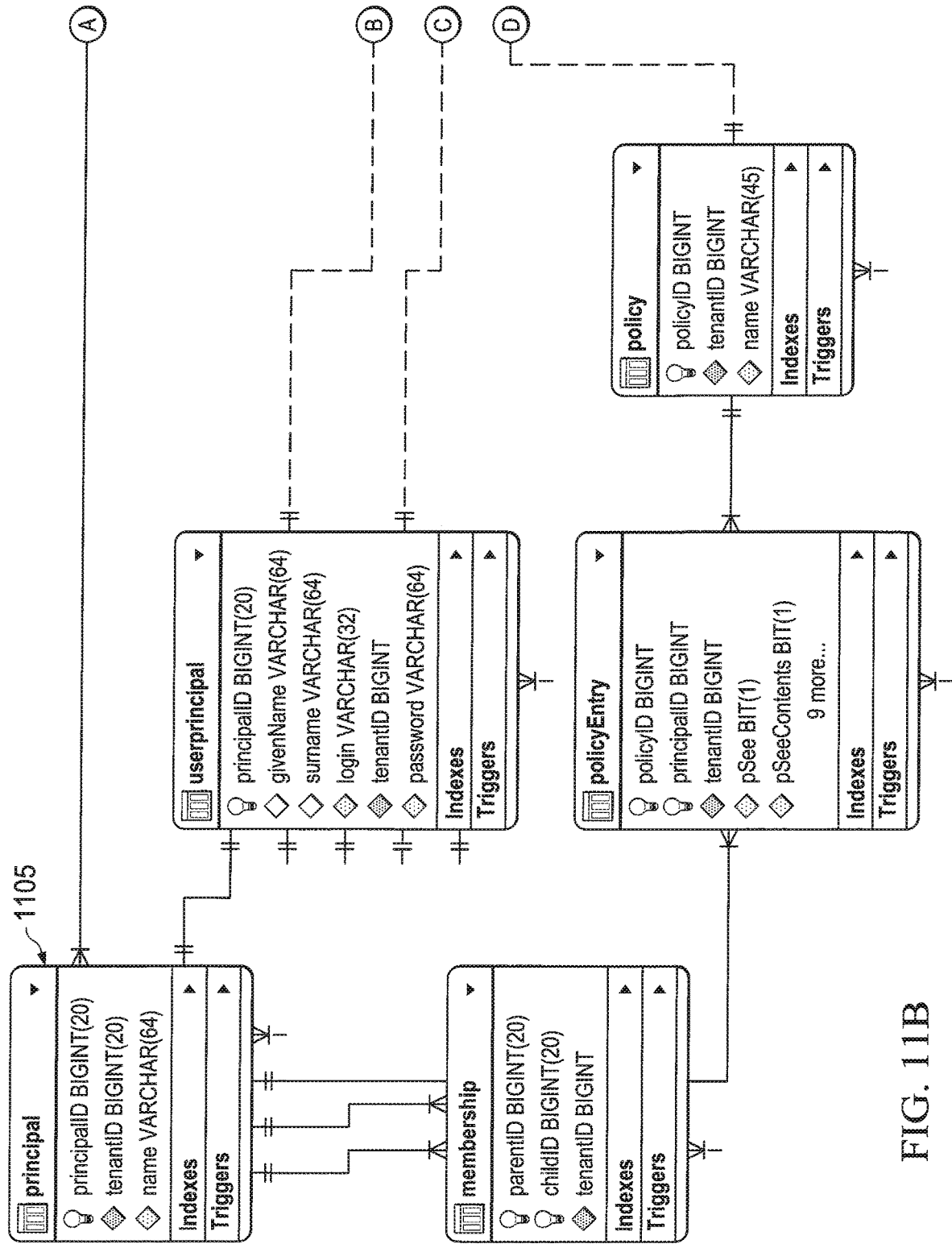

FIGS. 3-7 depict diagrammatic representations of document social interactions in one embodiment of a content management system having a social layer and a data storage layer. An example of a social layer is depicted in FIG. 10. An example of a data storage layer is depicted in FIGS. 11A-11B.

The social layer may include a message table. When a user posts a message (e.g., to his timeline, home page, and/or activity feed (collectively referred to herein as "feed") when he is logged in to his content management system account, see FIG. 9A), the content management system receives the message and makes an entry in the message table. In this case, the user is the "principal" of the message and is identified as such in the message table (via a principal identification (ID)). The content management system may also keep a timestamp for the message. The content management system can send the message to all who follow the user.

In the example of FIG. 3, User 1 follows or is a follower of User 2. When User 2 posts a message, the content management system sends a notification to User 1, for instance, by adding a message to User 1's feed.

In some embodiments, the content management system may also send the message to all who is mentioned in the message. In the example of FIG. 4, User 1 is not a follower of User 2 (i.e., User 1 does not follow User 2). However, User 2 specifically mentions or tags User 1 in a message. Thus, the content management system notifies User 1 that he is mentioned in the message posted by User 2.

In embodiments disclosed herein, social interactions can occur between different types of objects, including content objects, in the same or similar manner as described above. For example, a user can follow a document the same way as how he follows another user. Likewise, a document can follow a user or another document just like how a user can follow a document or another user. Here, "follow" is an example of social features of the social layer. Other social features may include, but are not limited to, likes, mentions, comments, etc. These social interactions among different types of objects are possible because, as discussed above, these different types of objects are instantiated from the same super class defined in the schema and thus inherit a set of properties and/or functions that are common to all objects in the content management systems.

Figure 5:
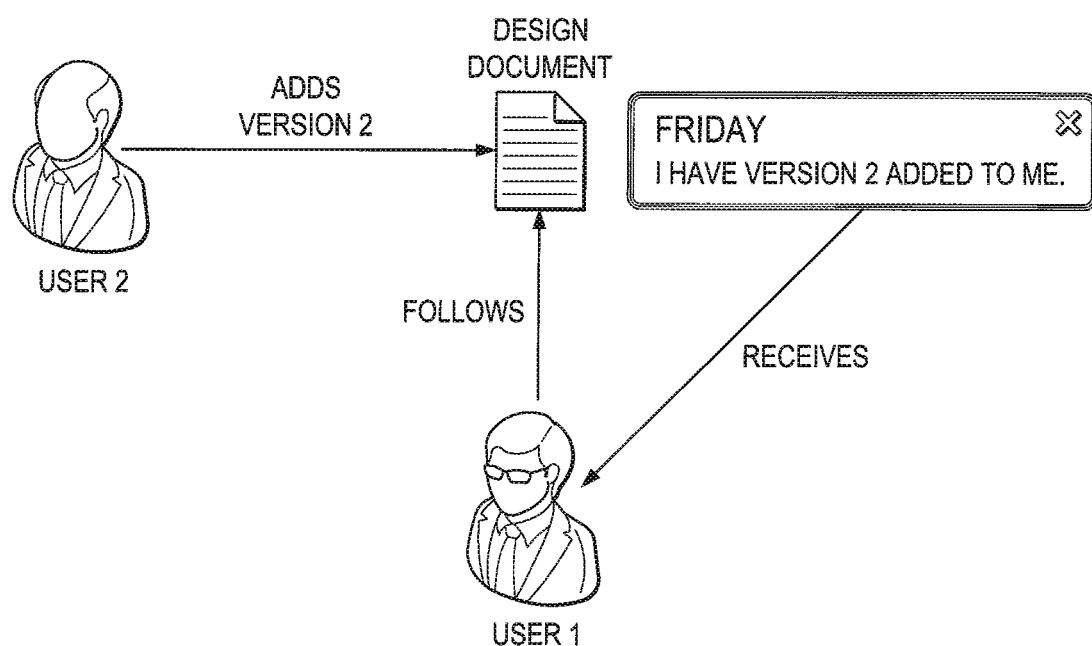

This is further illustrated in FIG. 5 where User 1 may follow a content object referred to as "Design Document." User 2 may add a version "Version 2" to "Design Document." Notice here that User 1 does not follow User 2 and User 2 did not specifically mention or tag User 1 in a message. Thus, User 1 does not get a message that indicates "User 2 modified Design Document." Rather, the content object ("Design Document") can let its follower(s) know that "I have been modified." The content object could, but does not have to, indicate who performed the modification.

In some embodiments, the above-described functionality may be performed by a system component at the social layer of the content management system embodied on non-transitory computer memory including instructions translatable by at least one processor. Specifically, when a content object is modified, a principal of the modification is identified. A principal is a type of object that identifies a particular type of user. Referring to FIG. 3, when a principal (e.g., User 2) posts a message, the message is entered into a table with an attribute indicating the creator (e.g., created by) and a principal ID identifying the one who wrote the message. In FIG. 5, when a principal (e.g., User 2) modifies a content object (e.g., "Design Document"), the system component generates and enters into a table a message "I have version 2 added to me," indicating that the message is created by the content object. To end users, it appears that the content object is posting the message. For a person (e.g., User 1) who is not following the principal, but is following the content object, the message will show up at his feed.

In this way, if a version is added to a document, a message is created from the perspective of the document, "I have a new version." Optionally, the document can mention that "my new version was created by this author."

Figure 6:
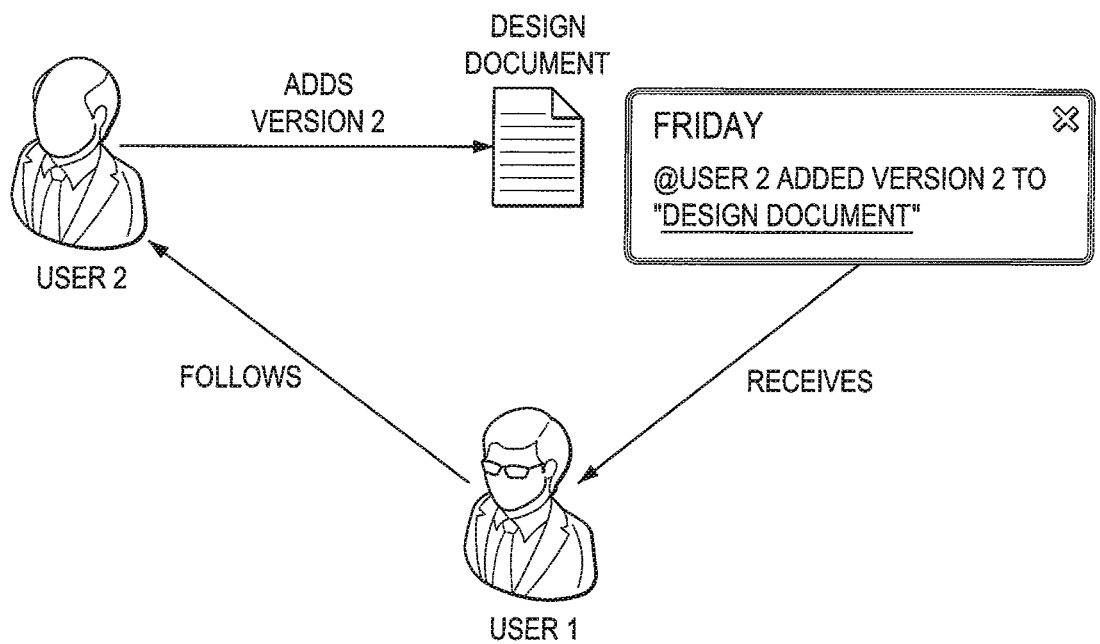

Internally, either the document or the user could send the message, the latter of which is illustrated in FIG. 6. In this example, User 1 follows User 2 but does not follow "Design Document." User 2 adds a new version to "Design Document" and User 1 gets a message on what User 2 has done. However, User 1 does not get a message from "Design Document" as shown in FIG. 5.

Figure 7:
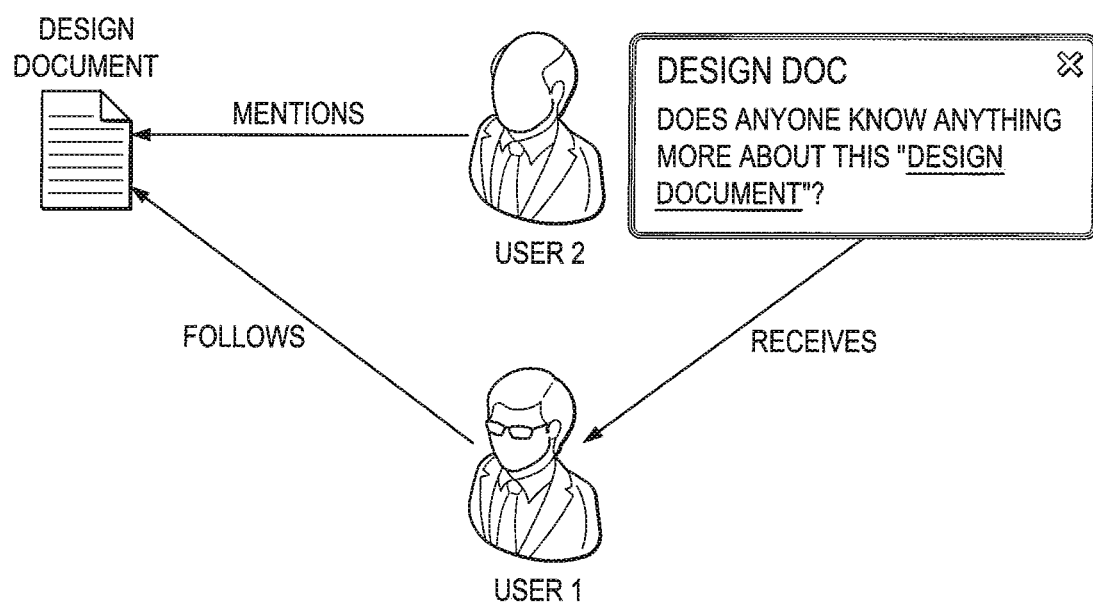

Follows of a content object may get messages from the content object in many ways. FIG. 7 illustrates another example social interaction among users and content objects. In FIG. 7, User 1 follows "Design Document" but not User 2. However, when User 2 mentions "Design Document" in a post, User 1 gets a message that "Design Document" was mentioned by User 2, even if User 1 does not follow User 2.

Unlike conventional content management systems, these social interactions do not occur in a separate social system. Rather, documents and users are now using and participating in the same social layer of a content management system. As such, a document can have its own timeline, home page, or activity feed, an example of which is shown in FIG. 8. As illustrated in FIG. 8, feed 800 associated with a document may show followers of the document, what the document follows, and/or what social networks (e.g., planning, product management forecast, market surveys, sales and marketing, etc.) the document is in.

In some embodiments, documents and users alike can act as brokers within their networks by bridging two networks that are not directly linked. Such open networks, which grow and evolve based on social interactions and not based on a predefined set of rules or a defined taxonomy/folder structure, can advantageously introduce new ideas and opportunities to their members.

In some embodiments, a document can follow other objects (via an API call) or be followed. As explained below, documents are designed in the schema the same as users (persons) as far as the content management system (e.g., a content server) is concerned.

In some embodiments, to allow a document (e.g., Document A) to follow another document, a piece of code may be associated with the document to identify itself to the system (e.g., "I am Document A") and instruct the system to make an API call to "like" a document "any time I am mentioned (referenced) in another document."

Accordingly, in embodiments disclosed herein, content is part of the intricate social layer of a content management system. Indeed, in some embodiments, content objects can have the same features as user objects. This is exemplified in FIGS. 9A-9B.

Figure 9A:
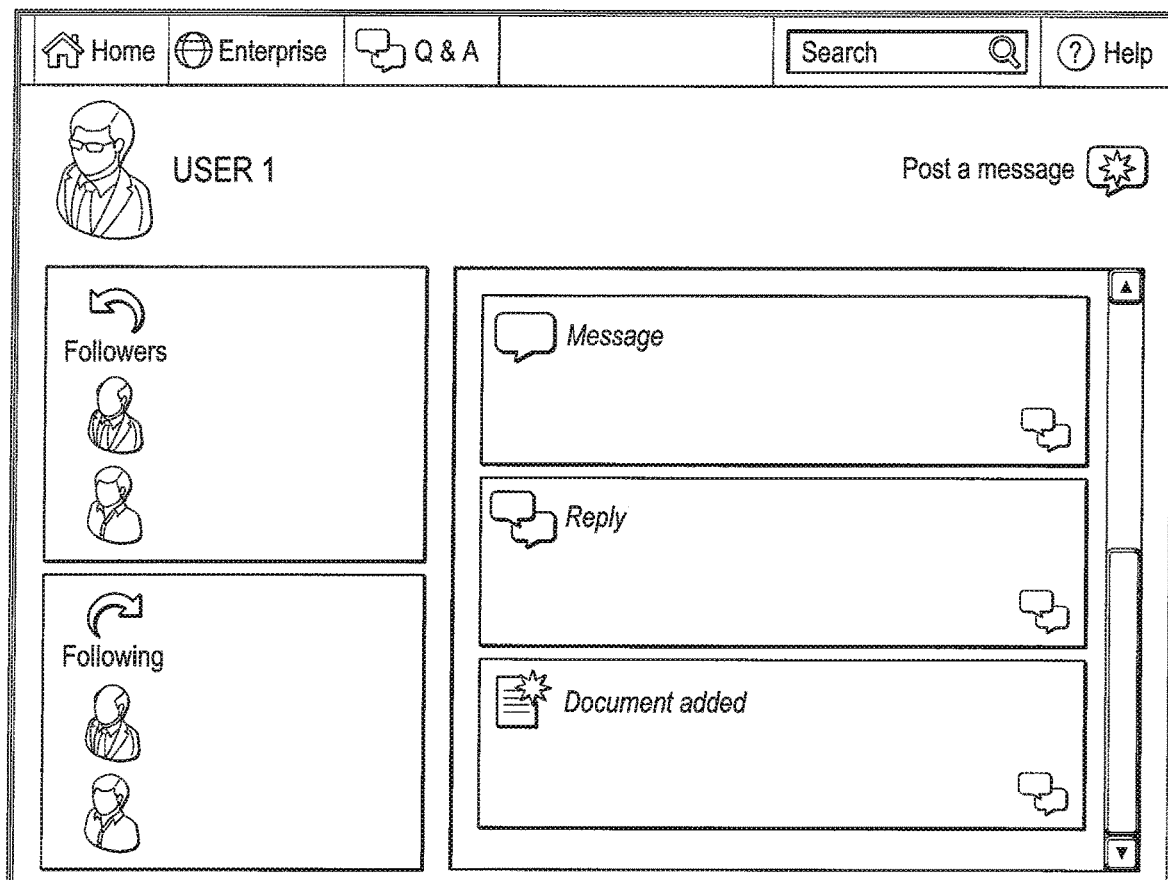
FIG. 9A depicts a diagrammatic representation of an example of a user's feed according to one embodiment.

In FIG. 9A, a user's feed may have messages and replies from other users, as well as a message from a document saying that it has been created. In some embodiments, a user's feed can show anything the user says, anything in response to something the user said, anything mentioning the user, and anything the user is following.

Figure 9B:
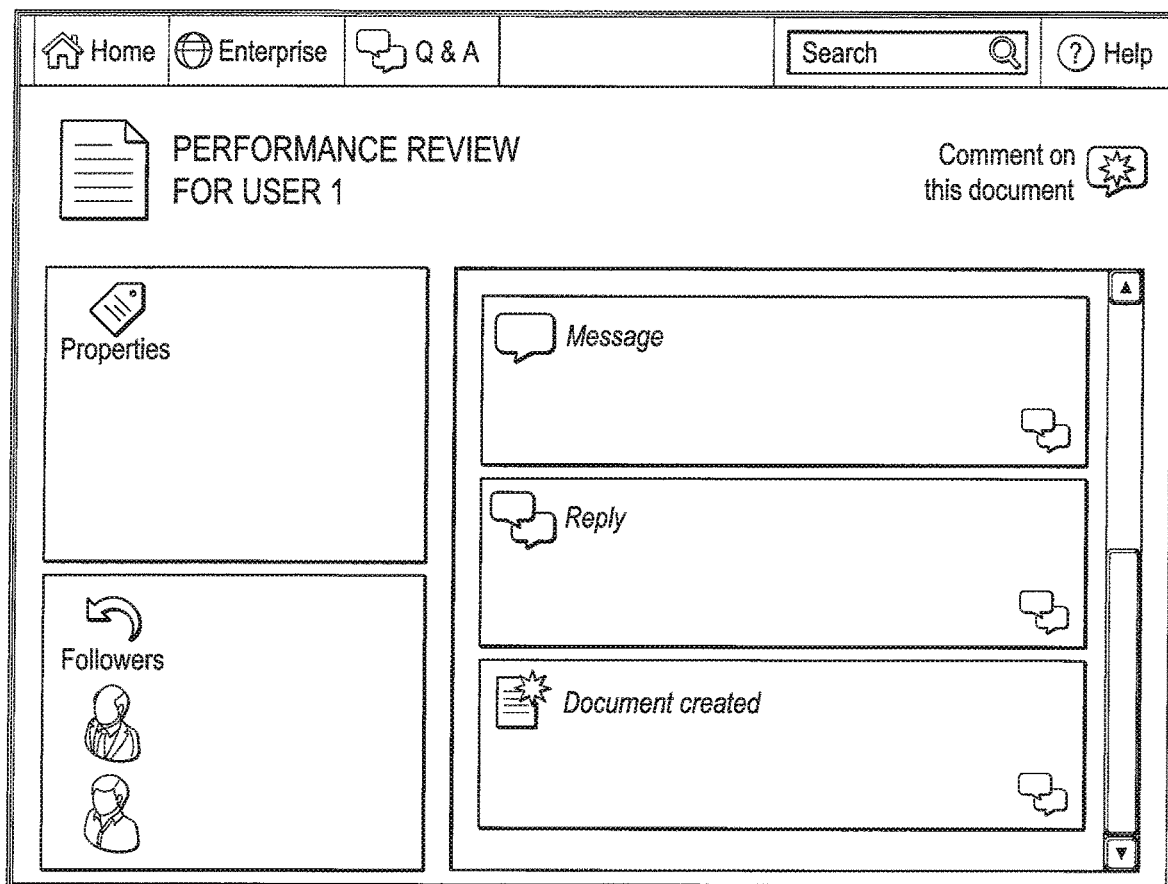
FIG. 9B depicts a diagrammatic representation of an example of a document's feed according to one embodiment.

As illustrated in FIG. 9B, the same type of feed is applied to a document. As with users, this feed shows all comments that mention the document. As described above, the feed may also show what the document "says"—that it has been created, or that someone added a version to it. That is, instead of the system automatically posting as the user saying that the user added a version, the document posts as itself that the user added a version to it. A document object is like a user object in that it has its own profile, and users can follow it like they follow people.

This behaviour of the document (which is governed by the properties/functions inherited from the super class described above) is very much unlike a traditional audit log. In a traditional content management system, a user can receive "notifications" of events happening on documents and folders. Usually, the users would subscribe to these notifications in a system completely separate from anything social. In embodiments of a content management system disclosed herein, any object (not just a document object) in the schema has the above-described social capability. A user can go to any object in the system and view its profile. For a user object, the profile shows a user photo, all the metadata, and everything about the user. Likewise, for a document object, the profile shows the document type, all the metadata, and everything about the document.

Because documents and folders are "objects" instantiated from the same schema, notifications of events on documents can be implemented using the same system by which a user 'follows' the activity of another user. By making documents, folders, and users all of the same super-type, they can all engage in the social activity of the system as equal participants.

To this end, objects instantiated from the super class may be referred to as "social" objects. A social object is a type of object that can be defined with social actions, examples of which may include "comment," "follow," "getting an update," "like," "thumbs up (e.g., indicating it's a good document)," etc. Thus, a document object instantiated from a super class defined in the schema disclosed herein may be referred to as a social document object, as opposed to a conventional document object. A social document object has all the attributes/characteristics of a social object that allow for "socializing" content, such as "following" a document, "liking" a document, or "commenting" on a document, etc. As described above, the document may post messages about changes made to and/or about it. In some embodiments, it may allow a user or document to "like" or "follow" a piece of content/text within the document. Using metadata, this allows for socializing a document on the level of a document paragraph.

FIG. 10 and FIGS. 11A-11B depicts portions of a database schema according to one embodiment, with FIG. 10 showing a social layer and FIGS. 11A-11B showing a data storage layer. In this example, the database schema is implemented in a multi-tenancy architecture. Multi-tenancy is known to those skilled in the art and thus is not further described herein. As it can be seen in this example database schema, users and groups (represented by principal objects instantiated from principal class 1105), documents and folders (represented by content objects instantiated from node class 1101), and versions of documents (represented by content objects instantiated from node class 1103), are all sub-types of 'object' super class 1100 and can all participate in social interactions (e.g., social interactions 1010-1050 shown in FIG. 10) using the exact same mechanisms.

For example, in this system, rather than a document having an audit trail that a user has to navigate to, documents have their own 'status feeds'. In the same way that a user can 'follow' another user to see their status messages, a user can follow a document or folder to see its status feed, and be notified of changes to the document. When a user comments on a document, it is the exact same system as a user posting a message to their status feed.

Figure 12:
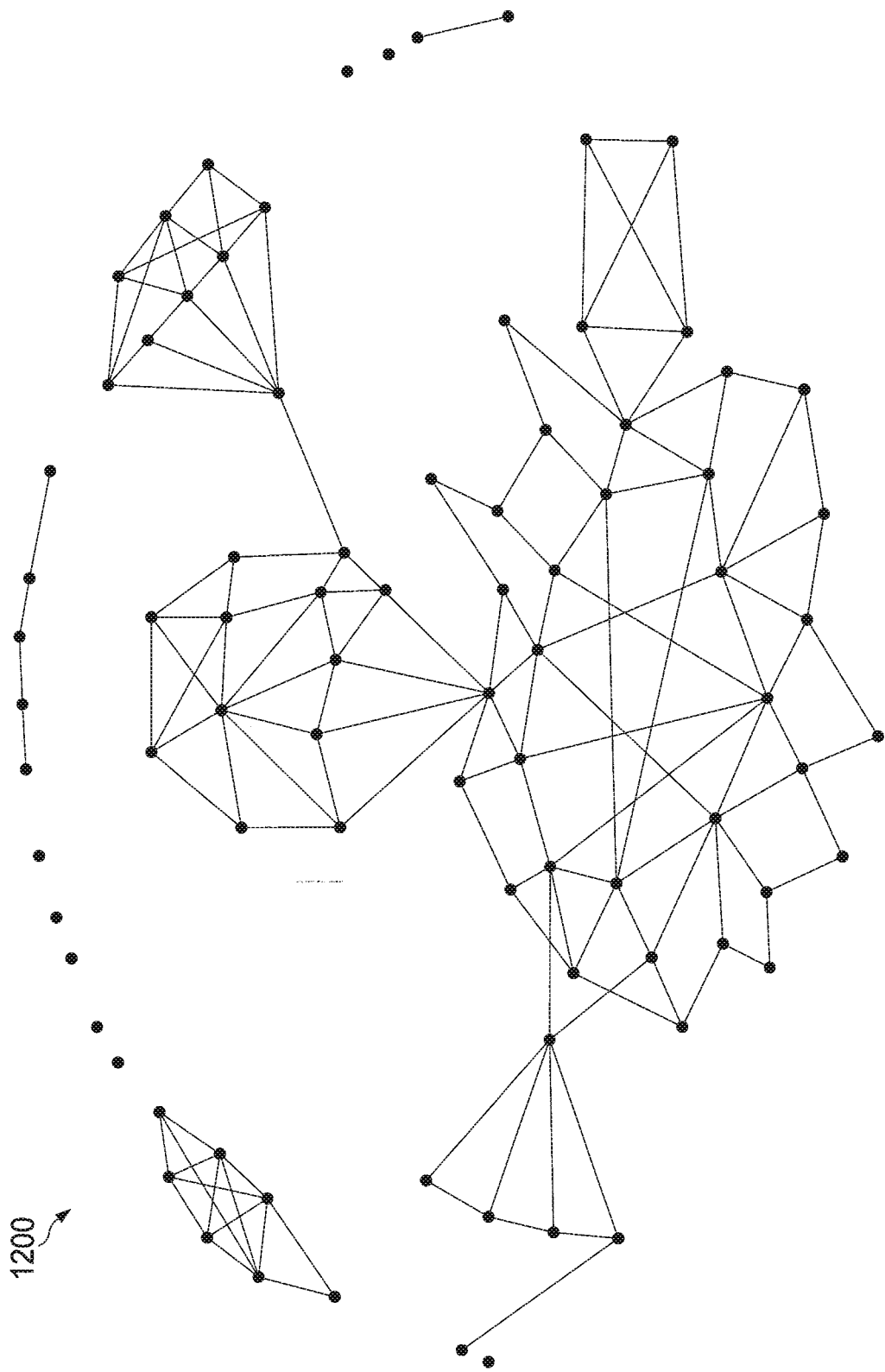
FIG. 12 depicts a diagrammatic representation of a social graph where users and documents alike are represented as nodes connected by edges representing relationships.

This allows the system to understand the relationships among users and documents and generate a social graph representing the relationships (see e.g., social graph 1200 shown in FIG. 12). This information can be stored in a database such as a relational database or a graph database. Relational and graph databases are known to those skilled in the art and thus are not further described herein.

In some embodiments, nodes in social graph 1200 represent entities such as user objects and documents object managed by the system. Properties are pertinent information that relate to nodes. The system may utilize such pertinent information to make appropriate recommendations. For example, the weight between two nodes may differ depending upon whether they have a direct connection or traversal is needed. Referring to FIGS. 5-7, User 1 may have a direct or indirect relationship with User 2 and/or "Design Document." The system can make a recommendation on with which node to associate User 1.

Figure 13:
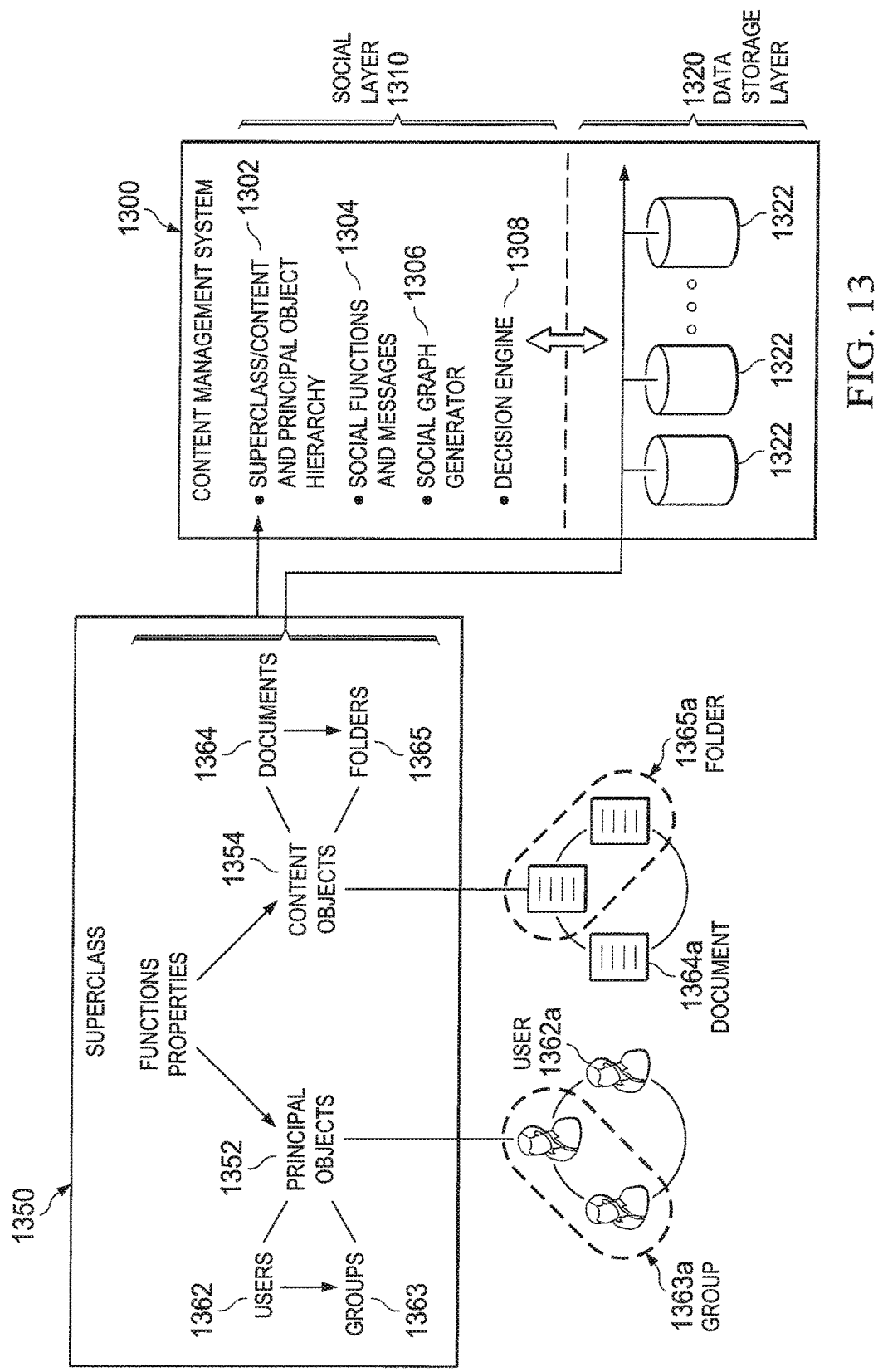
FIG. 13 depicts a diagrammatic representation of an example embodiment of a content management system and super class objects.

Referring now to FIG. 13, an embodiment of a content management system 1300 and super class objects 1350 is shown. Content management system 1300 includes components supporting a super class hierarchy including content objects and principal objects (generally denoted by reference numeral 1302). Content management system 1300 also includes a social functions and messages component 1304 for executing object functions and handling messages between and among social objects, a social graph generator component 1306 for generating, modifying, and maintaining a social graph including instances of social objects and relationships between and among social objects, and a decision engine 1308 for supporting and executing social object logic, as will be explained in further detail herein below. Super class hierarchy 1302, social functions and messages component 1304, social graph generator 1306, and decision engine 1308 can be said to form a social layer 1310 of content management system 1300.

Content management system 1300 also includes a data storage layer 1320 which includes storage 1322 for social objects of content management system 1300, coupled to the social layer 1310 for reading, modifying, and writing social objects in content management system 1300. Content management system 1300 also stores structured and unstructured information for documents, including document contents such as alphanumeric text, data, audio, video, and other media formats and modalities.

Content management system 1300 includes a super class of objects 1350 which can be said to be a parent class of principal objects 1352 and content objects 1354 in that principal objects 1352 and content objects 1354 inherit and share functions and properties from super class objects 1350. However, both principal objects 1352 and content objects 1354 may redefine functions as well as add functions from the super class object 1350 and add properties. Principal objects 1352 include user objects 1362 and group objects 1363. User objects 1362 may be grouped into group objects 1363. In much the same way, content objects 1354 include document objects 1364 and folder objects 1365. Document objects 1364 may be grouped into folder objects 1365.

FIG. 13 further depicts instances of user objects 1362*a* and group objects 1363*a* and instances of document objects 1364*a* and folder objects 1365*a*.

Figure 14:
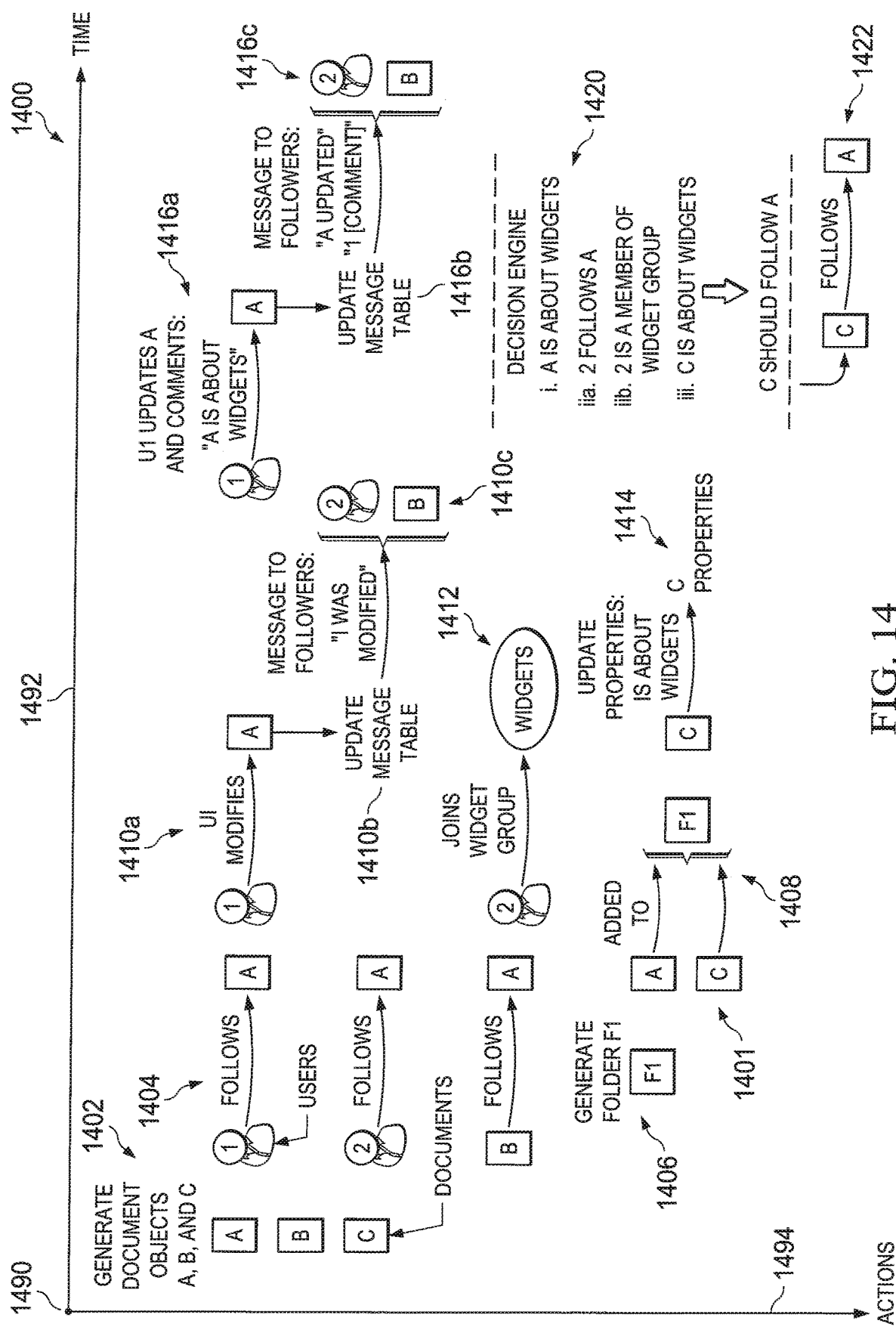
FIG. 14 depicts a diagrammatic representation of an example time series of events which may occur during operation of an environment in which an example embodiment of a content management system operates.

Referring now to FIG. 14, shown is an example time series of events 1400 which may occur during operation of an environment in which an example embodiment of a content management system (which may be the same or similar to content management system 100 described in conjunction with FIG. 1 or content management system 1300 described in conjunction with FIG. 13) operates. Here, time series of events 1400 is depicted in a graph 1490 in which horizontal axis 1492 represents progress of time and vertical axis 1494 represents a diagram of events (generally denoted by reference numeral 1401), which occur within, are fed into, and/or are supported by the content management system. Time series of events 1400 and their relationship to each other, object involvement, and operations will now be described.

The content management system generates document objects A, B, and C (1402). User 1, user 2, and document B "follows" document A (1404). The content management system generates a folder object F1 (1406) and document A and document C are added to folder F1 (1408). User 1 modifies document A (1410*a*) and, in response, the content management system generates a message stored in a message table of the content management system (1410*b*). The content management system sends the message to all followers of document A, namely user 2 and document B, that user 1 modified document A, for example "I was modified" (1410*c*). This can occur in a social profile or feed associated with document A and/or user 1, which is displayed to user 2.

User 2 joins the "widgets" group (1412). The content management system updates document C's properties, indicating that document C is about widgets (1414). This can occur as a result of a variety of mechanisms, including, but not limited to, an analysis of document C that determines that document C addresses widgets or includes information about widgets. Such an analysis may include a semantic analysis executed against document objects. The semantic analysis may include text analysis of a document to search for, identify, and generate semantic relationships within the document according to a predefined semantic model associated with the content management system.

User 1 updates and comments on document A, messaging that "A is about widgets" (1416*a*). The content management system generates a message stored in a message table of the content management system (1416*b*) and sends the message to followers of document A, once again, user 2 and document B (1416*c*).

A decision engine 1420 supports decision logic for social objects. Decision engine 1420 has access to events 1401 and can monitor events 1401 in order to perform operations in the content management system, such as operations on social objects. In a non-limiting example, decision engine 1420 is aware that (i) document A is about widgets (as noted by user 1), (ii) a user 2 follows document A, (ii) b user 2 is a member of the widget group, and (iii) document C is about widgets. Based on such event processing and social object status, the content management system determines that document C should follow document A, and generates the association (1422).

In some embodiments, decision engine 1420 may include a recommendation component, which performs various analyses on social objects and their relationships to generate recommendations to users and documents. Such users and/or users who manage document objects may act on such recommendations. For example, the recommendation engine can send a message to a user who manages a document that the document should follow another document, and the user can generate the relationship.

Figure 15:
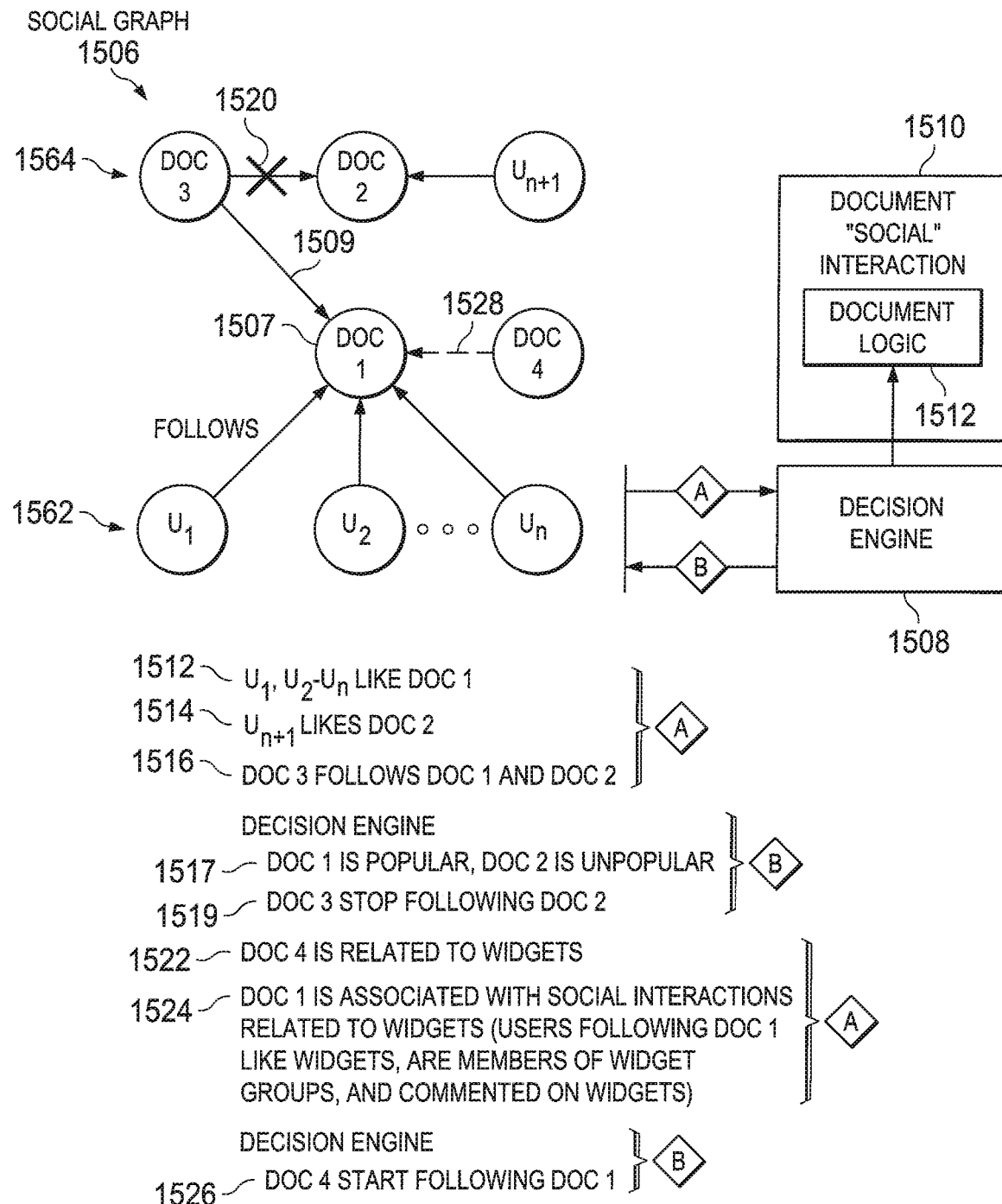
FIG. 15 depicts a diagrammatic representation of a social graph of users and document objects which feed and which are operated on by an embodiment of a document social interaction component including document logic and a decision engine to support document logic.

FIG. 15 depicts a diagrammatic representation of a social graph of users and document objects, which are operated on by an embodiment of a document social interaction component 1510 including document logic 1512 and a decision engine 1508 to support document logic 1512. Document social interaction component 1510 is a component of a content management system (as may be the same or similar to content management system 1300 described in conjunction with FIG. 13). FIG. 15 also depicts events, which occur in association with the social graph 1506. These events are generally denoted by the symbol A surrounded by a diamond. FIG. 15 further depicts decision engine operations generally denoted by the symbol B surrounded by a diamond of a decision engine 1508.

Social graph 1506 may be generated by a social graph generator of a content management system (which may be the same or similar to social graph generator 1306 and content management system 1300 described in conjunction with FIG. 13). Social graph 1506 includes super class objects such as user objects 1562 and document objects 1564 (respectively, principal objects and content objects), which are represented by nodes (generally denoted by reference numeral 1507) in social graph 1506. The objects are related to each other in some way, such relationships generally denoted by links 1509 between the objects. For example, links 1509 may include directional arrows, which denote that a first object (at the root of the arrow) follows a second object (at the head of the arrow).

In the example embodiment of social graph 1506 in FIG. 15, the links indicate that one object follows another object, such as object for user 1 (U1) follows object for document 1 (DOC 1), etc. As can be seen in social graph 1506, user 1, and user 2-user n (i.e., U1, U2-Un, where n is a number, such as 100) follow DOC 1, document 3 (DOC 3) follows DOC 1 and document 2 (DOC 2), and user n+1 (Un+1) follows DOC 2. Other relationships are described herein below.

Document social interaction component 1510 (which may be a subset of social functions and messaging component 1304 described in conjunction with FIG. 13) includes document logic 1512, which supports operations on document objects (for example, DOC 1, DOC 2, DOC 3, etc.). Document logic 1512 is supported by decision engine 1508. Decision engine 1508 may automatically execute operations on document objects (as will be further described herein below) and/or provide recommendations to social users.

Decision engine 1508, which has access to the social graph 1506, is aware that U1 and U2-Un like DOC 1 (1512) and that Un+1 likes DOC 2 (1514). It also knows that DOC 3 follows DOC 1 and DOC 2 (1516). Based on such information, decision engine 1508 determines that DOC 1 is popular (e.g., because many users like it) and that DOC 2 is unpopular because only Un+1 likes it (1517). Such determinations can be based on various algorithms, such as (but not limited to) a raw number of likes or monitoring trends in likes over time. The algorithm may be based on the type of objects that like another object, object groups, other objects which objects like, and so on. Because decision engine 1508 determines that DOC 2 is unpopular, it initiates an operation for DOC3 to stop following DOC 2 (1519), as denoted in social graph 1506 by reference numeral 1520. Such an operation can be part of an overall sweep of the social graph 1506 to remove any unfavourable, undesirable, or extraneous document object "likes" and relationships, or to establish relationships.

In another non-limiting example, decision engine 1508 is aware that document 4 (DOC 4) is related to widgets (1522). This information may be stored in the properties of DOC 4. It is also aware that DOC 1 is associated with social interactions related to widgets, for example, users following DOC 1 like widgets, are members of widget groups, and commented on widgets (1524). Based on such information, decision engine 1508 determines that DOC 4 should follow DOC 1 (1526) and generates such an association or link in social graph 1506 as denoted by reference numeral 1528.

Figure 16:
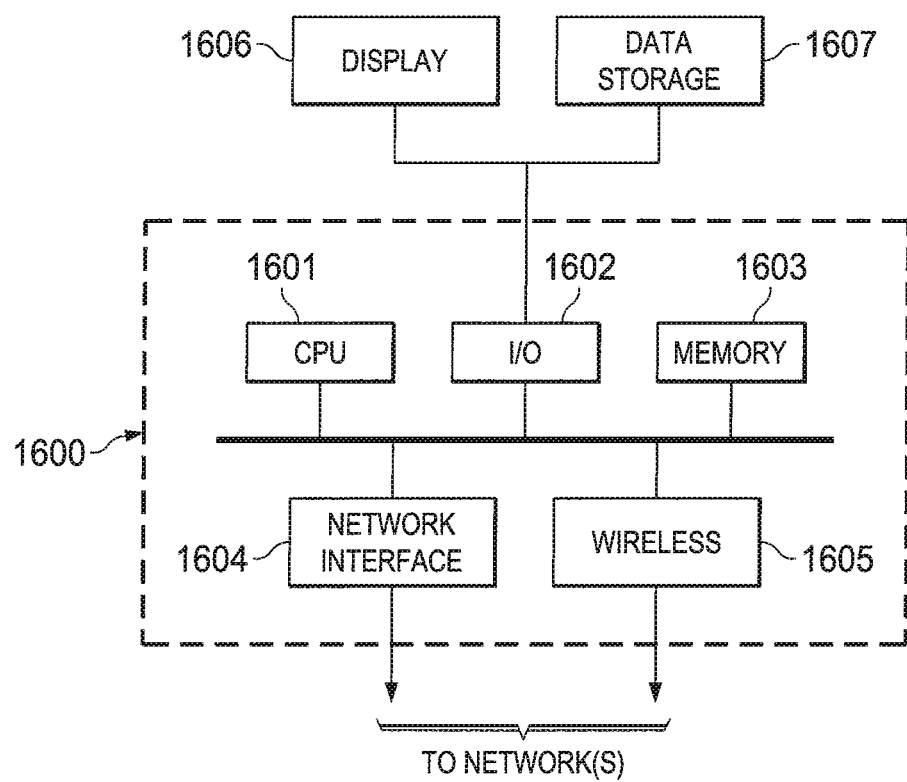
FIG. 16 depicts a diagrammatic representation of a data processing system for implementing some embodiments disclosed herein.

FIG. 16 depicts a diagrammatic representation of a data processing system for implementing some embodiments disclosed herein. As shown in FIG. 16, data processing system 1600 may include one or more central processing units (CPU) or processors 1601 coupled to one or more user input/output (I/O) devices 1602 and memory devices 1603. Examples of I/O devices 1602 may include, but are not limited to, keyboards, displays, monitors, touch screens, printers, electronic pointing devices such as mice, trackballs, styluses, touch pads, or the like. Examples of memory devices 1603 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1600 can be coupled to display 1606, information device 1607 and various peripheral devices (not shown), such as printers, plotters, speakers, etc. through I/O devices 1602. Data processing system 1600 may also be coupled to external computers or other devices through network interface 1604, wireless transceiver 1605, or other means that is coupled to a network such as a local area network (LAN), wide area network (WAN), or the Internet. The backend servers and client devices described above may each be a data processing system that is the same as or similar to data processing system 1600. Additionally, functional components necessary to implement embodiments disclosed herein may reside on one or more data processing systems that are the same as or similar to data processing system 1600.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
    generating, by a content management system operating in a computer network, document objects in a computer network, the document objects comprising a first social document object, the first social document object being associated with other objects having a set of common properties and functions that enable social interactions among the first social document object and the other objects;
    responsive to the first social document object being modified, generating, by the content management system, a message indicating that the first social document object has been modified; and
    sending, by the content management system, the message from the first social document object to the other associated objects.

2. The method according to claim 1, wherein the first social document object is modified by a first user.

3. The method according to claim 1, wherein the first social document object posts the message as itself.

4. The method according to claim 1, further comprising:
    maintaining, by the content management system, a social graph that maps social relations among the first social document object and the other associated objects.

5. The method according to claim 1, wherein the first social document object has a timeline, home page, activity feed, or activity stream and wherein the timeline, home page, activity feed, or activity stream of the first social document object shows the other associated objects as followers of the first social document object.

6. The method according to claim 5, wherein the content management system is adapted for supporting a plurality of social networks in the computer network and wherein the timeline, home page, activity feed, or activity stream of the first social document object indicates which of the plurality of social networks the first social document object is in.

7. The method according to claim 6, wherein the first social document object is in a first social network of the plurality of social networks, wherein a second user is in a second social network of the plurality of social networks, wherein the first social network and the second social network are linked through the first social document object and the second user, and wherein the first social network and the second social network are not directly linked.

8. A content management system, comprising:
    a processor;
    a non-transitory computer-readable medium; and
    stored instructions translatable by the processor for:
        generating document objects in a computer network, the document objects comprising a first social document object, the first social document object being associated with other objects having a set of common properties and functions that enable social interactions among the first social document object and the other objects;
        responsive to the first social document object being modified, generating a message indicating that the first social document object has been modified; and
        sending, by the content management system, the message from the first social document object to the other associated objects.

9. The content management system of claim 8, wherein the first social document object is modified by a first user.

10. The content management system of claim 8, the first social document object posts the message as itself.

11. The content management system of claim 8, wherein the stored instructions are further translatable by the processor for:
    maintaining a social graph that maps social relations among the first social document object and the other associated objects.

12. The content management system of claim 8, wherein the first social document object has a timeline, home page, activity feed, or activity stream and wherein the timeline, home page, activity feed, or activity stream of the first social document object shows the other associated objects as followers of the first social document object.

13. The content management system of claim 12, wherein the content management system is adapted for supporting a plurality of social networks in the computer network and wherein the timeline, home page, activity feed, or activity stream of the first social document object indicates which of the plurality of social networks the first social document object is in.

14. The content management system of claim 13, wherein the first social document object is in a first social network of the plurality of social networks, wherein a second user is in a second social network of the plurality of social networks, wherein the first social network and the second social network are linked through the first social document object and the second user, and wherein the first social network and the second social network are not directly linked.

15. A computer program product having a non-transitory computer-readable medium storing instructions translatable by a processor of a content management system for:

generating document objects in a computer network, the document objects comprising a first social document object, the first social document object being associated with other objects having a set of common properties and functions that enable social interactions among the first social document object and the other objects;

responsive to the first social document object being modified, generating a message indicating that the first social document object has been modified; and sending, by the content management system, the message from the first social document object to the other associated objects.

16. The computer program product of claim 15, wherein the first social document object is modified by a first user.

17. The computer program product of claim 15, the first social document object posts the message as itself.

18. The computer program product of claim 15, wherein the instructions are further translatable by the processor for:

maintaining a social graph that maps social relations among the first social document object and the other associated objects.

19. The computer program product of claim 15, wherein the first social document object has a timeline, home page, activity feed, or activity stream and wherein the timeline, home page, activity feed, or activity stream of the first social document object shows the other associated objects as followers of the first social document object.

20. The computer program product of claim 19, wherein the content management system is adapted for supporting a plurality of social networks in the computer network and wherein the timeline, home page, activity feed, or activity stream of the first social document object indicates which of the plurality of social networks the first social document object is in.

* * * * *